United States Patent [19]

Nelson

[11] Patent Number: 4,798,741

[45] Date of Patent: Jan. 17, 1989

[54] PREPARATION OF MICROENCAPSULATED PIGMENT

[75] Inventor: Jeffrey W. Nelson, Philadelphia, Pa.

[73] Assignee: E. I. Du Pont de Nemours and Company, Wilmington, Del.

[21] Appl. No.: 941,793

[22] Filed: Dec. 15, 1986

Related U.S. Application Data

[62] Division of Ser. No. 808,462, Dec. 13, 1985.

[51] Int. Cl.[4] .................. B01J 13/02; B05D 3/10; C09C 1/56
[52] U.S. Cl. ...................... 427/213.33; 106/476; 427/213.31; 427/213.34; 427/213.35; 427/213.36; 427/214; 430/138
[58] Field of Search ............ 427/213.31, 213.33, 427/213.34, 213.35, 213.36, 214; 106/308 P, 308 M, 476; 430/138

[56] References Cited

U.S. PATENT DOCUMENTS

| 3,190,837 | 6/1965  | Brynko et al.    | 427/213.33   |
|-----------|---------|------------------|--------------|
| 3,265,629 | 8/1966  | Jensen           | 427/213.33   |
| 3,510,435 | 5/1970  | Sirine           | 427/213.35   |
| 3,804,775 | 4/1974  | Shiozaki et al.  | 427/213.33   |
| 4,233,392 | 11/1980 | Friedel          | 430/264      |
| 4,297,235 | 10/1981 | Hoshi et al.     | 264/4.3      |
| 4,399,209 | 8/1983  | Sanders et al.   | 430/138      |
| 4,440,846 | 4/1984  | Sanders et al.   | 430/138      |
| 4,565,764 | 1/1986  | Nakahara et al.  | 428/402.2 X  |

FOREIGN PATENT DOCUMENTS 1294355 10/1972 United Kingdom .

Primary Examiner—Richard D. Lovering

[57] ABSTRACT

Pigment particles of a suitable size are microencapsulated by mixing them in a gelatin solution, coacervating the gelatin to coat them, cooling to set the gelatin, adding formaldehyde to harden the particles, sequestering unreacted formaldehyde with a bisulfite, adding gelatin to coat the hardened particles, precipitating the particles chemically or physically, and washing the precipitate.

5 Claims, No Drawings

PREPARATION OF MICROENCAPSULATED PIGMENT

This is a division of application Ser. No. 808,462, filed Dec. 13, 1985

DESCRIPTION

1. Technical Field

This invention relates to silver halide wash-off films. More particularly this invention relates to silver halide wash-off films which contain a pigment in encapsulated form.

2. Background Art

It is generally known that exposed photographic materials which contain a gelatin/silver halide layer which is slightly hardened or unhardened can be hardened imagewise by development using tanning developing substances. The oxidation products of the tanning developer formed in the exposed areas of the image have the property of hardening gelatin. On the other hand, in the unexposed areas of the image where there is no development, this hardening does not occur. These areas of the image, therefore, can be washed off with warm water or can be transferred wholly or partially onto an image-receiving material.

It is known from U.S. Pat. No. 2,596,756 "Photomechanical Copy Method" to add pigments, especially carbon black, to the light-sensitive layers of these materials to bestow upon the transferred image parts a sufficient optical density.

A wash-off material is known from U.S. Pat. No. 3,364,024. "Photographic Process" where a silver halide emulsion layer and a carbon black-containing gelatin layer which is free of silver halide is arranged on the same side of the emulsion support. This layer containing carbon black is likewise imagewise hardened during development and contributes to the formation of the necessary optical density, thereby reducing the amount of silver halide needed to produce an image. However, these carbon black-containing materials have considerable disadvantages which result from a reciprocal effect or action between carbon black and gelatin. Carbon black brings about an undesirable hardening of the gelatin contained in the emulsion layer on the emulsion support side and thus after a short holding time this leads to a hardening of the total layer. This undesirable hardening leads to the result that, after exposure and development, it is not possible to make a sufficient differentiation between the hardened and nonhardened areas of the image. Because this disadvantageous effect of carbon black is proportional to its concentration in the layer there is naturally a limitation to the amount of carbon black which can be incorporated in these layers and, thus, the possibility of reducing the silver halide amount required to attain a certain optical density.

In order to be able to use higher carbon black concentrations in the layers, it has already been suggested to use layers with a high content of gelatin or to introduce the carbon black in a separate layer and, as known from British Pat. No. 1,294,355, additionally to provide a separating layer between the emulsion support and the light-sensitive layer. Aside from the fact that the problem of poor storability cannot satisfactorily be solved by these measures, the resolving power of such materials is so poor because of the high layer density or the intermediate layers that they are unusable for many applications.

An improved gelatin-containing silver halide wash-off film is the subject of Friedel U.S. Pat. No. 4,233,392 wherein the premature hardening which can be caused by the presence of pigment particles such as carbon black in this type of film can be largely overcome by pretreating the carbon black with water-miscible compounds having higher affinity for carbon black than gelatin.

Encapsulation techniques have been extensively employed in the silver halide field. Taylor U.S. Pat. No. 3,369,900 teaches preparing microcapsules to contain dye or printing oil. Miller U.S. Pat. No. 3,386,824 teaches plastic microcapsules to release processing solutions. Besauw et al. U.S. Pat. No. 3,645,911 teaches encapsulating photographic ingredients such as hydroquinone, compounds yielding thiosulphate ions, color couplers, developing agents comprising a water-soluble noble metal salt, etc. Taylor U.S. Pat. No. 3,702,829 teaches prepared microcapsules with low isoelectirc point gelatin. Bryan U.S. Pat. No. 3,443,984 and Rogers et al. U.S. Pat. No. 3,832,183 deal with encapsulation of silver halide with gelatin and polymer. Despite the general knowledge of the use of microencapsulation technology with silver halide films and materials related thereto, it is not known to apply microencapsulation technology to silver halide wash-off films. This is the case even though with prior art wash-off films to was observed that untreated black or color pigments do not provide sharp and clear images because the unexposed areas adhere to the support instead of cleanly washing off and stain from the pigment is present in areas that should be clear.

It has been found that an improved wash-off film can be obtained through the use of microencapsulation whereby background stain is reduced without the need for an underlying gelatin layer or pretreating the carbon black with water-miscible compounds having higher affinity for carbon black than gelatin.

DISCLOSURE OF THE INVENTION

In accordance with this invention there is provided a wash-off film comprising a support coated with at least one layer which contains unhardened gelatin, a gelatino silver halide emulsion, and a microencapsulated pigment, a tanning developer being present in the emulsion layer or a layer adjacent to the emulsion layer.

In accordance with another aspect of this invention there is provided a process for the preparation of a microencapsulated pigment comprising:

A. mixing pigment particles having a particle size of 20 $\mu$m or less in a gelatin solution, B. coacervating the gelatin to coat the pigment particles, C. cooling to set the gelatin, D. adding formaldehyde to harden the particles, E. sequestering unreacted formaldehyde with a bisulfite, F. adding gelatin to coat the hardened particles, G. precipitating the particles chemically or physically, and H. washing the precipitate.

In accordance with still another aspect of this invention there is provided a process for the preparation of a microencapsulated pigment comprising A. mixing pigment particles having a particle size of 20 $\mu$m or less in a solution of a polymer, B. coacervating the polymer to coat the pigment particles, C. hardening the polymer by crosslinking or copolymerization, D. adding additional polymer to coat the hardened particles, E. precipitating the mixture chemically or physically, and F. washing the precipitate.

The wash-off films of this invention utilize components of known silver halide wash-off films. Such films are described in U.S. Pat. Nos. 3,364,024, 3,440,049 and 4,233,392 which are incorporated herein by reference. The pigment, e.g., carbon black or colored pigment such as cyan, magenta or yellow, however, is present in the film in encapsulated form, i.e., as a microencapsulated pigment. The pigment size is 20 μm or less, preferably 0.1 to 4 μm. The encapsulated pigment is preferably present in a layer in combination with unhardened gelatin and gelatino silver halide emulsion, which may be a negative or direct positive photographic emulsion. The tanning developer can be present in the emulsion layer or in an auxiliary layer, such as an overcoat layer. The thickness of the photosensitive, pigment-containing layer is from 5 to 100 μm. The emulsion layer has a dry coating weight of about 50 to 250 mg/dm$^2$. Other auxiliary layers can be present, e.g., gel subbing layer, backing layer, etc.

Encapsulation of the pigment particles can be made by means of a coacervation process using a suitable polymer, e.g., gelatin, gum arabic, polyvinyl alcohol or polyamide. Techniques such as described in U.S. Pat. Nos. 2,712,507, 2,730,456, 2,730,457, 2,800,457 and 2,800,458 are useful for forming microencapsules. Ethanol, methanol, sodium sulfate and similar alcohols and salts can be employed in the process whereby the polymer precipitates out of solution to form a coating on the pigment particles.

Suitable pigments which may be used in addition to carbon black include:

yellow: Cromophtal ® Yellow 3G (C.I. No. Pigment Yellow 93). Hostaperm ® Yellow 3G (C.I. No. Pigment Yellow 154);

magenta: Monastral ® Violet R (C.I. No. Pigment violet 19), 2,9-Dimethylquinacridone (C.I. No. Pigment Red 122), Indofast ® Brilliant Scarlet R6300 (C.I. No. Pigment Red 123);

cyan: Monastral ® Blue G (C.I. No. Pigment Blue 15), Monastral ® Blue (BT 383D) (C.I. No. Pigment Blue 15), Monastral ® Blue G (BT 284D) (C.I. No. Pigment Blue 15), Monastral ® Green GT (751D) (C.I. No. Pigment Green 7).

While the coacervation coating is an important step in the encapsulation of the pigments used in the present invention, procedures which follow coacervation can be varied or be optional depending on the polymer used and the desired results. Thus, while cooling or chilling to set is useful with gelatin, It would be inappropriate for some other polymers, e.g., polyvinyl alcohol. When gelatin is coacervated to coat the pigment particles, after the cooling to set the gelatin; formaldehyde is added to harden the gelatin-coated particles. Subsequently unreacted formaldehyde is sequested, e.g., with potassium bisulfite, sodium bisulfite, an organic bisulfite, etc. Additional gelatin is added in an amount sufficient to coat the hardened particles and the particles are precipitated chemically by coagulation or physically by centrifuging or filtration. The precipitate is then washed, e.g., with water or water-alcohol solution. In the embodiment of the process wherein a polymer is coacervated to coat the pigment particles, acrylate, urethane, phenolformaldehyde and epoxy polymers and resins may be employed. The polymer may be hardened by chemical crosslinking or copolymerizing depending upon available unsaturation and reactive sites. Additional polymer is added in an amount sufficient to coat the hardened polymer particles and the particles are precipitated chemically or physically as described above. The precipitate is then washed, e.g. with water, water-alcohol or solvent for unreacted reagents. A milling or grinding step may be used to break up clumps of gelatin or polymer coated particles. Filtration may be used to eliminate oversized particles and clumps that may be present. Ultrasonic dispersion is useful at various steps of the process since then it is not necessary to introduce an internal stirring device. The use of an ultrasonic mixer is optional, however, since the process can be carried out with conventional stirring or mixing equipment.

While the amount of polymer used may be as little as required to obtain a coacervation coating, it was found that quite satisfactory results were obtained when gelatin was used as the polymer at gelatin to pigment dry weight ratios of from 1.5:1 to 0.5:1. After hardening the gelatin or polymer, a similar amount of unhardened gelatin or polymer is added to coat the microcapsules. A preferred mode of the invention is illustrated in Example 1.

INDUSTRIAL APPLICABILITY

The wash-off films for tanning development of this invention are advantageous due to the reduction in background stain without the use of a special auxiliary layer, e.g., an underlying gelatin layer. The films have excellent storability. Various pigments can be used, e.g., carbon black for negative and positive reproduction films, and cyan, magenta and yellow pigments for color reproduction. The wash-off films are useful for conventional applications such as the reproduction of drawings and outlines and more critical uses as well, e.g., reproduction of fine line originals and halftone originals with high rulings for contact and camera work.

EXAMPLES

The following Preparations and Examples wherein the parts and percentages are by weight illustrate the invention but do not limit it.

PREPARATION 1

An encapsulated yellow pigment was prepared as follows:
 (1) Mix:
   1.0 g of a 5% gelatin solution,
   3.7 g water,
   0.33 g yellow pigment (15% pigment and 1% Triton ®X-100, octylphenoxy polyethoxy ethanol).
 (2) Add 5.5 ml ethanol to form coacervation (upon addition small curd formation was observed) and continue stirring.
 (3) Add 10 ml portion of cold water and subject the mixture to ultrasonic dispersion in an ice bath for 15 minutes.
 (4) Add 0.05 ml 37% formaldehyde and stir for 10 minutes.
 (5) Add 0.1 g sodium bisulfite and stir for 5 minutes.
 (b 6) Add 1.10 g 5% gelatin solution, and stir until well mixed.
 (7) Precipitate with ethanol.

(8) Centrifuge precipitate.
(9) Wash twice with water.

PREPARATIOn 2

The following encapsulated pigments were prepared.

| Color | g. 5% GELATIN | g. WATER | g. PIGMENT (15% DISPERSIONS) |
|---|---|---|---|
| Yellow[1] | 2.0 | 6.0 | 2.0 |
| Magenta[2] | 2.0 | 5.0 | 3.0 |
| Cyan[3] | 2.0 | 6.0 | 2.0 |
| Black[4] | 2.0 | 6.0 | 2.0 |

[1]Cromophtal ® Yellow 3G (C.I. No. Pigment Yellow 93), below 1 μm size
[2]2,9-Dimethylquinacridone (C.I. No. Pigment Red 122), below 1 μm size
[3]Monastral ® Blue G (C.I. No. Pigment Blue 15), below 1 μm size
[4]Furnace Black, 4 μm size Using twice the amounts of additives set out in steps (2) to (9) of Preparation 1, the indicated encapsulated pigments were prepared.

PREPARATION 3

The following encapsulated carbon black pigment samples were prepared.

| Sample | g. 10% GELATIN | g. CARBON BLACK 40% DISPERSION | g. WATER | DRY WT. GELATIN IN PIGMENTS (%) |
|---|---|---|---|---|
| 1 | 5.0 | 0.625 | 4.38 | 2.0 |
| 2 | 5.0 | 1.25 | 3.75 | 1.0 |
| 3 | 5.0 | 1.88 | 3.12 | 0.67 |

Each sample was treated as follows:
(1) Add 10 ml ethanol with stirring (during stirring a curdy precipitate formed).
(2) Pour into 20 m ice water and stir well
(3) Add 0.5 ml 37% formaldehyde and stir for 10 minutes.
(4) Add 1.0 g sodium bisulfite and stir for 10 minutes.
(5) Add 2 g 1% gelatin solution and stir well.
(6) Precipitate by pouring into 20 ml ethanol.
(7) Centrifuge and wash twice with 50% ethanol in water.
(8) Add up to 10 ml water to precipitate.
(9) Ball mill for 2 hours with ceramic balls.

EXAMPLE 1

A silver halide wash-off film coating composition was prepared by combining 2.0 g of an unhardened 70:30 gelatino silver chlorobromide emulsion with 1.0 g of developer solution containing 4% hydroquinone, 4% Dimezone ®S, 0.4% sodium sulfite and 1.0 g pigment dispersion (15%). Control films were prepared by coating the compositions on gelatin subbed polyester supports and drying. The films were imagewise exposed and processed by being sequentially sprayed with 10% sodium carbonate activator, sodium thiosulfate fixer and 40° C. water to produce a wash-off image. Control images were obtained with yellow, cyan, magenta and black step wedges and grey scales which exhibited various degrees of background stain and ragged images representing unwanted adhesion.

Films were prepared and tested like the controls except that 1.0 g of each of the encapsulated pigments of Preparation 2 was substituted for the pigment dispersion of the Control. Stain and unwanted adhesion was significantly reduced or eliminated for the wash-off films containing the encapsulated pigment.

EXAMPLE 2

Black and white wash-off films were prepared as described in Example 1 except that the samples of Preparation 3 were used. After exposure and processing the films containing encapsulated carbon black all showed significantly lower stain in unimaged areas than control films containing untreated carbon black. The varied amounts of gelatin used to encapsulate the carbon black had no apparent effect on image quality.

CONTROL

A control support was prepared by coating a gelatin subbed polyester support with gelatin and Ludox ®AM colloidal silica to provide a protective layer. Control films were prepared by coating the control compositions of Example 1 onto the protective layer. After exposure and processing these control films with the protective layer gave clearer and sharper images due to lower stain and unwanted adhesion comparable to films of the present invention in Examples 1 and 2.

This example illustrates that the encapsulated pigments of the present invention allow direct addition to a wash-off film composition without the necessity for an extra coating step to add a protective gelatin underlayer.

EXAMPLE 3

Wash-off films were prepared as described in Example 1 except that tanning developer was placed in an overcoat layer instead of the silver halide layer. Similar improved image quality was provided by the encapsulated pigments.

EXAMPLE 4

Wash-off films were prepared as described in Example 1 except that the unhardened gelatino silver halide emulsions were silver chloride and silver iodobromide. Similar improvement was provided by the encapsulated pigment.

I claim:
1. A process for the preparation of a microencapsulated pigment comprising:
   A. mixing pigment particles having a particle size of 20 μm or less in a gelatin solution,
   B. coacervating the gelatin to coat the pigment particles,
   C. cooling to set the gelatin,
   D. adding formaldehyde to harden the particles,
   E. sequestering unreacted formaldehyde with a bisulfite,
   F. adding gelatin to coat the hardened particles,
   G. precipitating the particles chemically or physically, and
   H. washing the precipitate.
2. A process according to claim 1 wherein ethanol is added in steps B and G.
3. A process according to claim 1 wherein the mixing is accomplished by ultrasonic mixing.
4. A process according to claim 1 wherein the pigment is carbon black.
5. A process according to claim 1 wherein the microencapsulated pigment has a gelatin to pigment ratio of from 1.5 to 1 to 0.5 to 1.